(No Model.)
A. PURSELL.
GEARING FOR VELOCIPEDES.
No. 465,998. Patented Dec. 29, 1891.
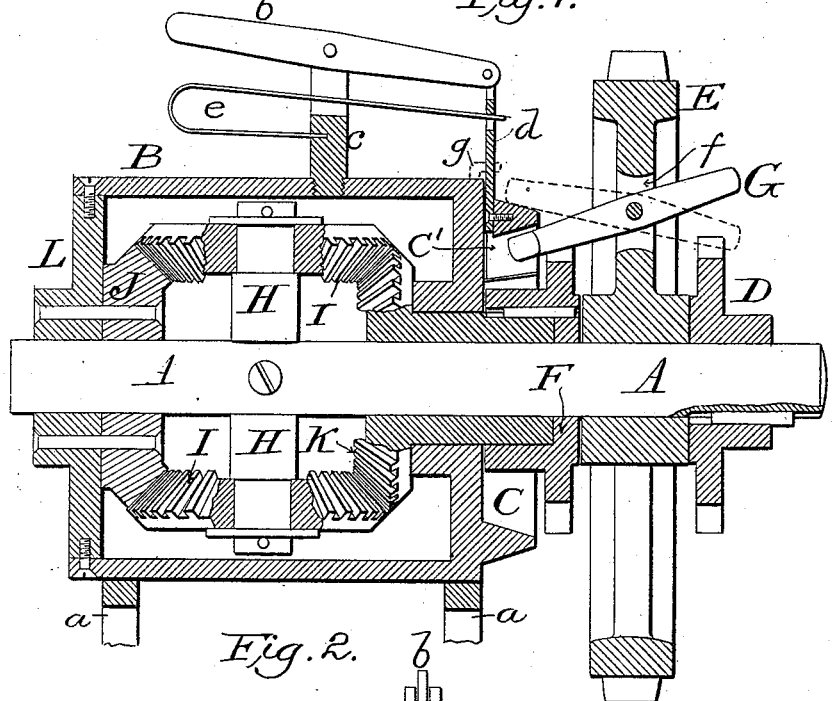
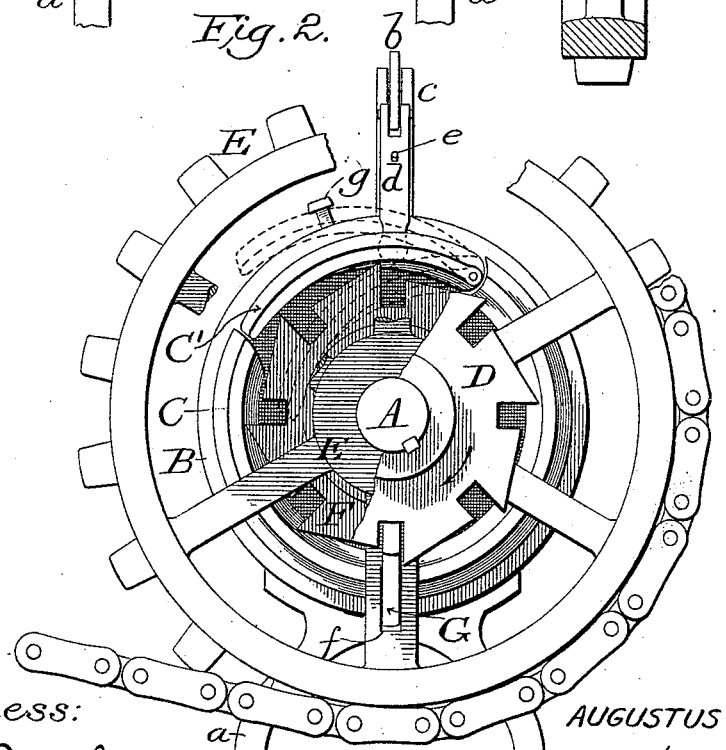
Witness:
James F. Duhamel
Horace A. Dodge
AUGUSTUS PURSELL,
Inventor,
by Dodge Sons,
Attys.

UNITED STATES PATENT OFFICE.

AUGUSTUS PURSELL, OF WILLIAMSPORT, PENNSYLVANIA, ASSIGNOR OF ONE-HALF TO GEORGE A. COHICK, OF SAME PLACE.

GEARING FOR VELOCIPEDES.

SPECIFICATION forming part of Letters Patent No. 465,998, dated December 29, 1891.

Application filed August 7, 1891. Serial No. 402,021. (No model.)

*To all whom it may concern:*

Be it known that I, AUGUSTUS PURSELL, a citizen of the United States, residing at Williamsport, in the county of Lycoming and State of Pennsylvania, have invented certain new and useful Improvements in Gearing for Velocipedes and Similar Vehicles, of which the following is a specification.

My invention relates to changeable-speed gearing designed more particularly for bicycles, tricycles, and similar vehicles, but equally well adapted for use upon other machinery.

In using bicycles and tricycles, for which the invention is specially devised, it frequently becomes desirable to so regulate, control, or adjust the gearing as to give power while ascending hills and speed while riding upon level ground, and this is accomplished by my construction with ease and certainty and without the use of wrenches or special tools.

In the drawings, Figure 1 is a longitudinal sectional view through the main shaft or axis; and Fig. 2, an end elevation, partly in section.
A indicates a shaft, which may be either a driving-shaft or a shaft to be driven, the mounting of the same depending upon the use to which the invention is put. For the purposes of illustration I have shown the shaft as supported by and as capable of rotation in a hollow shell or casing B, having feet or supporting-legs *a*, adapted to receive screws or bolts by which the device as a whole may be secured in position; or the shell or casing may be supported by hangers in a bicycle and the shaft A become the pedal or driving-shaft thereof. This shell or casing B has secured to or formed upon one end a circular rim or flange C, a section C′ of which is hinged at one end, as shown in Fig. 2, and adapted to be raised and lowered out of and into line with the main portion of the flange, as shown by dotted lines in said figure, for a purpose presently explained. In order to raise and lower or open and shut this gate or hinged section C′, there is employed a lever *b*, pivoted at a point between its ends to a post *c* on the shell or supporting-hanger and connected at its outer end by a link *d* with the said gate, a spring *e* being employed to hold the gate normally closed or in line with the main body of the rim or flange. By depressing the free or inner end of the lever *b* the lever will be rocked and, acting through the link *d*, raise the hinged section C′, as shown in dotted lines in Fig. 2, the upward movement being regulated or controlled by a stop *g*, secured to the casing or hanger. By depressing the opposite end of the said lever *b* the hinged gate or section C′ will be lowered or moved inward toward the shaft and out of line with the main portion of the rim or flange, the inward movement being controlled by the said gate or section coming into contact with the hub of a wheel F, mounted upon the shaft or in any other suitable manner.

Upon the outer end of shaft A is rigidly affixed a ratchet-wheel D, while adjacent to the latter there is a sprocket-wheel E, which is mounted loosely upon the shaft. Between the outer end of the shell B and the sprocket-wheel E is a second ratchet-wheel F, which is mounted loosely upon the shaft, as shown in Fig. 1.

G indicates a pawl or dog comprising merely a short bar pivoted at a point between its ends to one of the arms or spokes of the wheel E, the said arm or spoke being advisably slotted, as at *f*, to receive the pawl, which latter projects from both sides of the wheel E, so as to engage the ratchet-wheels D and F. It will be noticed upon reference to Fig. 1 that when the pawl is in engagement with the wheel F it will be out of engagement with the wheel D, and vice versa, and that, owing to this arrangement, the sprocket-wheel may be locked either to the fast ratchet-wheel D or to the loose ratchet-wheel F at will. When the pawl is in engagement with the ratchet F, the nose of the pawl will be found to project inward within the circular flange or rim C C′, which latter prevents the pawl from accidentally riding out of engagement with the ratchet F.

When it is desired to disconnect the wheels E and F and connect the wheels D and E, the hinged gate or section C′ is lowered, as shown in dotted lines in Fig. 2, and the nose of the pawl brought opposite the opening thus formed in the rim or flange. The pawl is now carried through this opening and rests at its inner end upon the periphery of the circular rim or flange C C'; but in thus passing the pawl out through this opening the said pawl rides up the face of the gate or section and is rocked upon its pivot, its inner end being carried up out of engagement with wheel F and its outer end thrown down into engagement with wheel D, the new position of the pawl being indicated by dotted lines in Fig. 1.

When it is desired to disconnect the wheels D and E and connect the wheels E and F, the hinged gate or section is raised, as also shown in Fig. 2, and by turning the shaft the pawl is brought under the raised free end of the gate or section, and as it rides along the under face of the latter it will be rocked upon its pivot, its inner end being thrown down into engagement with wheel F and its outer end thrown out of engagement with wheel D. The gate or hinged section, being again closed, forms, in connection with the fixed portion of the rim or flange C, a circular track, over or under which the inner end of the pawl rides as the shaft rotates or is rotated, and which keeps the pawl from becoming accidentally disengaged from wheels D and F.

When the wheels D and E are locked together, one revolution of the shaft will effect a single revolution of the wheel E; but when the wheels E and F are locked together one revolution of the shaft effects two revolutions of the wheel E, the latter arrangement being employed when speed is desired and the former when power is the desideratum.

It is of course plain that the locking together of the wheels D E, the former of which is rigidly affixed to the shaft, will permit a uniform rotation of the shaft and the sprocket-wheel E; but in order that the locking together of the wheels E and F may permit an increase of speed with a corresponding decrease in power I employ the gearing shown in Fig. 1, upon reference to which it will be seen that the shaft A is provided with an arm or arms H, upon the ends of which are loosely mounted the bevel-gears I. These gears I engage similar gears J and K, secured, respectively, to the removable end plate L of the shell B and to the hub of ratchet-wheel F.

It is to be observed that the bevel-gear J, being fast to the shell or casing B, does not turn or rotate, but forms a track, as it were, upon which the gear or gears I travel when motion is imparted to the latter by or through the shaft.

Now when the wheels E and F are locked together by the pawl and motion is imparted by the shaft the gears I, mounted upon the arms H, projecting from the shaft, will revolve with said arms bodily around the shaft; but inasmuch as these gears I are in engagement with the fixed gear J, they will receive an accelerated motion each about the arm H as an axis, the rotary motion thus imparted to the gears I being equal to about twice the speed of rotation of the shaft. The gear-wheel K, mounted loosely upon the shaft, but rigidly secured to the ratchet-wheel F, engages the gear-wheels I, and the double or accelerated motion imparted to the latter is transmitted to the wheel K and through the wheel F and pawl G to the wheel E. From this it follows that it takes but one revolution of the shaft to effect two revolutions of the wheel E when the wheels E and F are connected or locked together. When the wheels D and E are locked together by the pawl, it is obvious that a single rotation of the shaft will effect a single rotation of the wheel E, as the ratchet-wheel D, to which the wheel E is temporarily connected, is rigidly affixed to the shaft.

It is not essential that the shaft A have two arms H, as one arm and one gear I will effect the same result as the construction shown; but I prefer to employ two arms and two gears, as there is less strain on the shaft and more uniformity in the action of the gearing.

While I have shown the wheel E as made in the form of a sprocket-wheel, I do not wish to restrict myself thereto, as it is obvious that a band-wheel or belt-pulley could be substituted therefor. So, too, while I have spoken of the wheel E as the point at which the power is taken off, it is obvious that the wheel E may represent a driving-wheel or the point at which the power is applied.

On the application of the invention to a bicycle I would employ a sprocket-wheel on the rear hub of the machine approximately of same size as wheel E and use but one chain. By pressing either end of lever b with either foot the connection of wheel E is made with either ratchet and change of speed and power obtained without stopping or alighting from the bicycle.

Having thus described my invention, what I claim is—

1. In combination with a shaft and gearing substantially such as shown, the fast and loose ratchet-wheels mounted upon the shaft, the intermediate loose wheel, and the pawl carried thereby and adapted to engage either of the ratchets.

2. In combination with a shaft and gearing substantially such as shown, the fast and loose ratchet-wheels, the intermediate loose wheel, the pawl carried thereby, and the circular rim or flange.

3. In combination with a shaft and gearing substantially such as shown, the fast and loose ratchet-wheels, the intermediate loose wheel and its pawl, and a circular rim or flange having a movable gate or section.

4. In combination with shaft A and shell or casing B, fast and loose ratchets D and F, intermediate wheel E, having pawl G, a rim or circular flange C, having a hinged gate C', arm H, secured to shaft A and provided with a bevel-gear I, a bevel-gear K, secured to ratchet F, and a bevel-gear J, secured to the end wall L of the shell or casing.

5. In combination with shaft A and gearing substantially such as shown, the fast and loose ratchets, the intermediate wheel provided with a pawl, a circular rim or flange having a hinged section, a pivoted lever $b$, and a link $d$, connecting the lever with the hinged section.

6. In combination with a shaft and gearing substantially such as shown, the fast and loose ratchets, the intermediate loose wheel, the pawl carried thereby to engage either of said ratchet-wheels at will, and a circular rim or flange having a hinged section to act upon the nose of the pawl and adapted to throw the latter into and out of engagement with the ratchet-wheels.

7. In a velocipede, the combination, with a shaft and gearing substantially such as shown, of the fast and loose ratchets, the intermediate loose wheel, the pawl carried by the latter, the circular rim or flange having a hinged section, and a foot-lever $b$ for actuating the hinged section.

8. In a velocipede, the combination, with a driving-shaft, of a ratchet-wheel rigidly affixed thereto, a sprocket-wheel loosely mounted upon the shaft and provided with a pawl, a ratchet-wheel loosely mounted upon the shaft, and doubling gear between shaft and the loose ratchet.

In witness whereof I hereunto set my hand in the presence of two witnesses.

AUGUSTUS PURSELL.

Witnesses:
HARRY S. MEYER,
HAN H. CARTER.